(12) United States Patent
Manfredotti et al.

(10) Patent No.: US 7,806,774 B2
(45) Date of Patent: Oct. 5, 2010

(54) MAGNETICALLY-DAMPED SUPERCRITICAL TRANSMISSION SYSTEM

(75) Inventors: Thomas Manfredotti, La Colle sur Loup (FR); Damien Sequera, Nimes (FR)

(73) Assignee: Eurocopter, Marignane (FR)

(*) Notice: Subject to any disclaimer, the term of this patent is extended or adjusted under 35 U.S.C. 154(b) by 405 days.

(21) Appl. No.: 11/941,144

(22) Filed: Nov. 16, 2007

(65) Prior Publication Data

US 2008/0116316 A1 May 22, 2008

(30) Foreign Application Priority Data

Nov. 16, 2006 (FR) .................................. 06 10008

(51) Int. Cl.
*F16C 3/00* (2006.01)
(52) U.S. Cl. .......................................... 464/180; 310/51
(58) Field of Classification Search .................. 464/180; 310/51, 90.5; 74/574.1; 244/60
See application file for complete search history.

(56) References Cited

U.S. PATENT DOCUMENTS

| 4,082,974 | A | * | 4/1978 | Yamamoto et al. | ........ 310/51 X |
| 4,947,067 | A | * | 8/1990 | Habermann et al. | ........... 310/51 |
| 5,059,845 | A | * | 10/1991 | Wilson | ...................... 310/90.5 |
| 5,521,448 | A |  | 5/1996 | Tecza et al. |  |
| 5,834,867 | A | * | 11/1998 | Kikuchi et al. | ................. 310/51 |
| 5,982,131 | A | * | 11/1999 | Aino | ........................ 310/51 X |
| 2002/0065139 | A1 |  | 5/2002 | Krysinski et al. |  |
| 2008/0293503 | A1 | * | 11/2008 | Vignal | ........................ 464/180 |
| 2008/0309184 | A1 | * | 12/2008 | Eilers et al. | ................ 310/90.5 |

FOREIGN PATENT DOCUMENTS

| JP | 2-97742 | 4/1990 |
| WO | WO 99/50950 | 10/1999 |

* cited by examiner

*Primary Examiner*—Greg Binda
(74) *Attorney, Agent, or Firm*—Young & Thompson

(57) ABSTRACT

A mechanical transmission system for a rotorcraft, including a supercritical transmission shaft and an active magnetic damper secured to the structure of the rotorcraft via a mechanical damper is provided.

7 Claims, 3 Drawing Sheets

MAGNETICALLY-DAMPED SUPERCRITICAL TRANSMISSION SYSTEM

The present invention relates to improvements applied to systems for transmitting mechanical power by means of a transmission shaft that is connected to a structure, in particular an aircraft structure, via an active magnetic bearing, or damper.

The technical field of the invention is that of manufacturing helicopters.

BACKGROUND OF THE INVENTION

The present invention relates in particular to a transmission system comprising a transmission shaft presenting two longitudinal ends, in which a connection member, such as a deformable coupling member, is fitted to each end of the shaft, the two connection members connecting the shaft respectively to two rotary members of the rotorcraft such as a main gearbox (MGB) at one end and a tail rotor gearbox (TRG) at the other end, thus enabling the shaft to drive a rear rotor, or tail rotor, of the rotorcraft from the MGB via the TRG.

Patents FR 2 817 234 and U.S. Pat. No. 6,680,554 describe such a power transmission system between two gearboxes of a helicopter, the system including a (hollow) tube acting as a transmission shaft.

The shaft is said to be "supercritical", which means that the frequency corresponding to the speed of rotation of the shaft (in its normal operating range) is higher than the lowest resonant (natural) frequency of the shaft.

An active magnetic damper is placed between the two gearboxes; the damper is controlled by a computer making use of signals delivered by a sensor that is responsive to the lateral (radial) position of the shaft, and including a proportional, integral, and differential (PID) regulator for the purpose of damping the vibrations of the shaft as it passes through resonant frequencies.

The magnetic damper corresponds to an active radial magnetic bearing that damps the vibrations of the shaft, it presents radial stiffness that is low enough to avoid shifting the resonant frequencies of the shaft by more than 3%, and it presents clearance of 3 millimeters (mm) to 4 mm relative to the shaft.

As a result in particular of the complexity and the critical nature of the hardware and software components of an active magnetic bearing, implementing them on board a rotorcraft suffers from the high development costs that are necessary in order to enable them to be qualified or certified.

Patents EP 1 068 665 and U.S. Pat. No. 6,268,676 describe a system for supporting a shaft that includes a passive radial magnetic bearing in which the magnetized stator portion (i.e. the non-rotary portion) is connected to a support via four elastomer dampers.

The mass and the stability of such a system make it difficult to use for supporting a rotorcraft transmission shaft.

OBJECTS AND SUMMARY OF THE INVENTION

An object of the invention is to propose such mechanical transmission devices or systems that are improved and/or that remedy, at least in part, the shortcomings or drawbacks of known devices.

In one aspect, the invention provides a rotorcraft transmission system comprising a transmission shaft that can be mounted to rotate, in particular relative to the rotorcraft, via two non-magnetic bearings, and an active magnetic damper that extends around the shaft, the system further comprising a supplemental or non-magnetic damper serving to secure the magnetic damper to the structure of the aircraft and arranged to limit the radial oscillations of the shaft and/or of the magnetic damper.

In preferred embodiments of the invention:

the non-magnetic damper may be a mechanical damper that may include a member or mechanism that is deformable and/or that acts by friction (between two parts);

in a variant or in addition, the mechanical damper may include a member or mechanism that is deformable and/or that acts in compression, traction, and/or shear;

the mechanical device may include a return member conferring greater mechanical stiffness to the damper;

the mechanical damper may include a plurality of connections each allowing pivoting about an axis;

the mechanical damper may include a plurality of connections each allowing sliding in a plane perpendicular to an axis;

the mechanical damper may include four connections by contact, each enabling pivoting about an axis and also sliding in a plane perpendicular to the axis, with dry friction;

the connections may allow pivoting about two mutually-perpendicular transverse axes that intersect on the longitudinal axis of the shaft;

the magnetic damper may include four identical electromagnets (primary magnetic circuits) rigidly connected to one another by a structure that is secured to the structure of the aircraft via the mechanical damper; and the axes of the connections may coincide substantially with the longitudinal axes of the electromagnets.

In the event of the active magnetic damper failing, the nonmagnetic damper serves to damp mechanically the oscillations of the shaft in register with the magnetic damper.

BRIEF DESCRIPTION OF THE DRAWINGS

Other aspects, characteristics, and advantages of the invention appear from the following description that refers to the accompanying drawings that show, without any limiting character, preferred embodiments of the invention.

FIG. 2 is a view on II-II of FIG. 3.

MORE DETAILED DESCRIPTION

Figure 2:
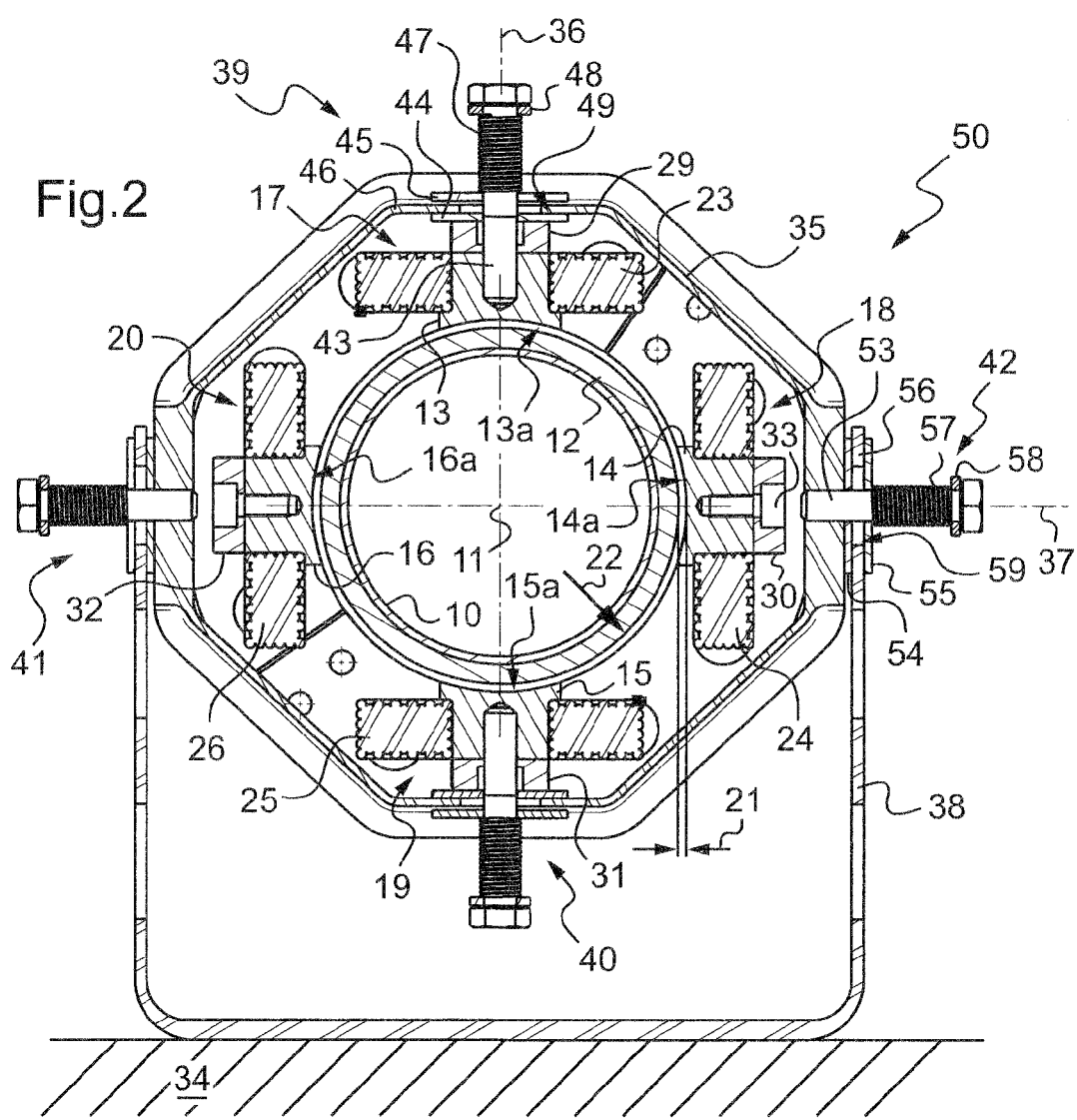
FIG. 2 is a diagrammatic cross-section showing a radial vibration damper assembly for a shaft for rotating a rotorcraft rotor.
Figure 3:
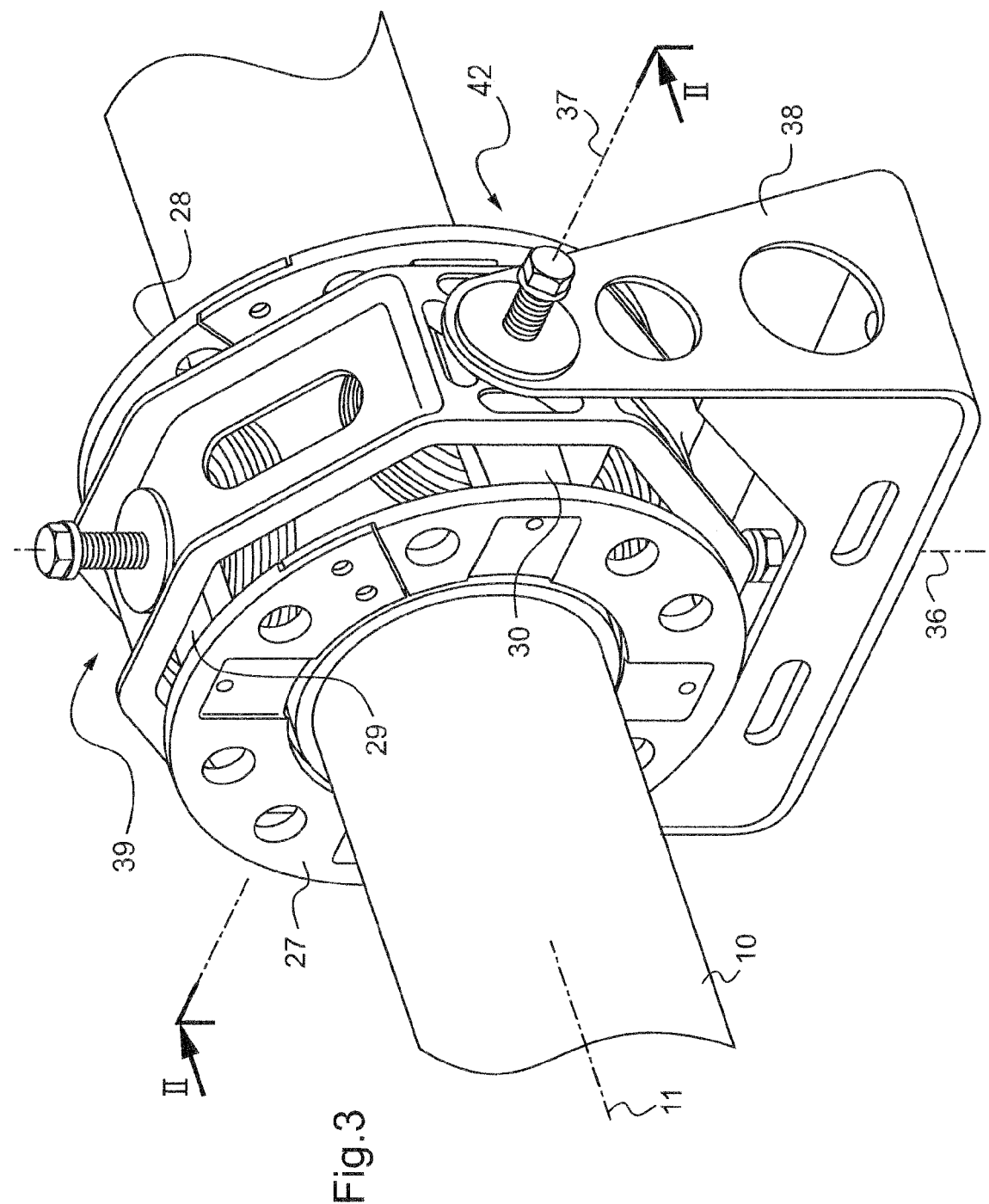
FIGS. 3 and 4 are two diagrammatic perspective views of a portion of a transmission shaft and of a damper system of the invention seen from two distinct viewing angles.
Figure 4:
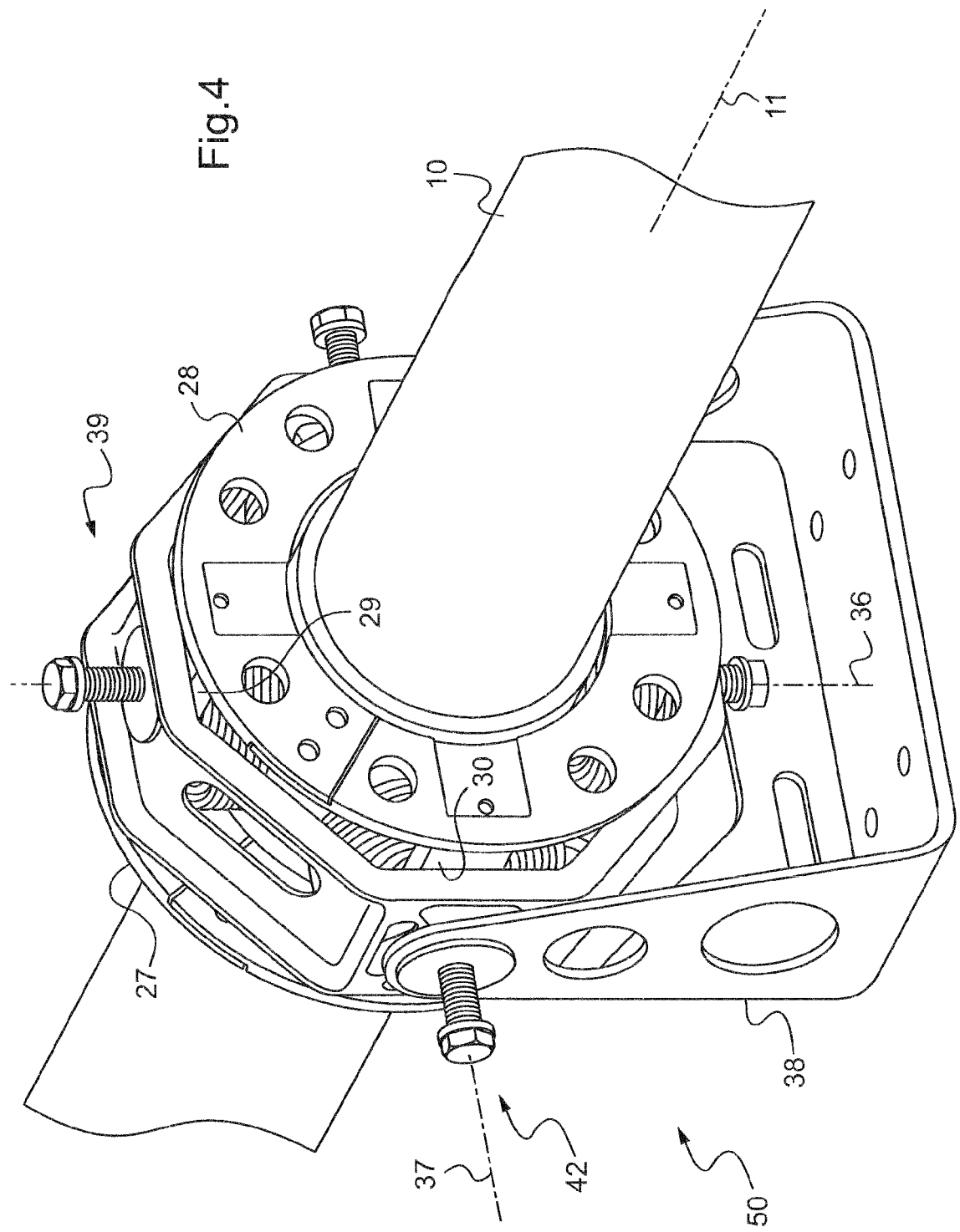

With reference to FIGS. 2 to 4 in particular, the hollow transmission shaft 10 extends along an axis 11 and presents on its outside face a projecting ring 12 of ferromagnetic material selected to co-operate with (i.e. to be attracted by) the cores 13 to 16 of each of electromagnets 17 to 20 of the magnetic damper.

The function of the magnetic damper is to limit the radial movement speeds of the portion of the shaft around which it extends, and where appropriate to hold the shaft in a position that is substantially centered relative to the end faces 13a to

16a of the four cores 13 to 16, i.e. with substantially identical airgaps 21 for all four electromagnets.

By way of example, for a shaft having a diameter of about 100 mm, an airgap of about 1 mm or 2 mm is provided when the shaft is centered.

The four electromagnets are identical and rigidly interconnected.

The respective inside faces 13a to 16a of the cores 13 to 16 are of concave cylindrical shape of radius equal to the outside radius of the ferromagnetic ring 12 secured to the shaft 10, plus the value of the airgap 21, and of axis parallel to the (theoretical) axis 11 of the shaft 10.

Each core comprises a central body surrounded by a coil 23 to 26 powered by a generator (not shown) controlled by a computer (not shown) to damp or limit lateral (i.e. radial) displacements of the portion of shaft that include the ring 12.

The four cores are mutually interconnected by two flanges 27 and 28 interconnected by four spacers 29 to 32 respectively secured to the cores by screws such as the screw referenced 33 in FIG. 2.

The flanges 27 and 28 are perpendicular to the (theoretical) axis 11 of the shaft 10, and in alignment on said axis, while the spacers 29 to 32 are regularly spaced apart (at 90°) around the axis 11, as are the electromagnets.

In accordance with an aspect of the invention, the set of electromagnets and the structure 27 to 32 supported thereby and secured relative to the structure 34 (FIG. 2) of the helicopter via a mechanism 50 that damps, and where appropriate limits, radial oscillations of the structure 27 to 32.

In the embodiment corresponding to FIGS. 1 to 4, the mechanism 50 comprises a frame 35 extending around the electromagnets, together with a U-shaped bracket 38 to which the frame 35 is connected and that rests on the structure 34 of the rotorcraft, being rigidly secured thereto.

The frame 35 and the bracket 38 extend substantially transversely relative to the axis 11.

Figure 1:
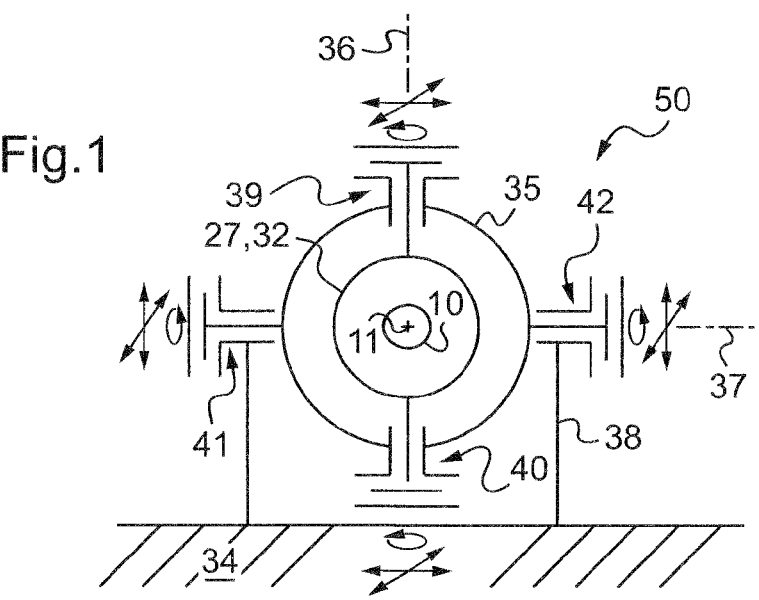
FIG. 1 is a diagram showing the main components of the mechanism of a mechanical damper supporting the electromagnets of an active magnetic damper, in a preferred embodiment of the invention.

As shown diagrammatically in FIG. 1, the structure 27-32 is connected to the frame 35 by two connections 39, 40 that are diametrically opposite (relatively to the point representing the axis 11).

Similarly, the frame 35 is connected to the bracket 38 by two connections 41, 42 that are diametrically opposite.

Each of the connections 39 to 42 allow pivoting with friction about an axis and also movement in translation by sliding with friction in a plane orthogonal to the axis:

the connections 39 and 40 allow the assembly 27-32 to pivot about the axis 36 and to slide relative to the frame 35, in a plane perpendicular to said axis; and the connections 41 and 42 enable the frame 35 to pivot about an axis 37 and to slide perpendicularly to said axis, relative to the bracket 38.

The axes 36 and 37 are orthogonal and coplanar; they lie in a plane that is transverse, i.e. perpendicular to the axis 11, and they intersect on the axis 11.

With reference to FIG. 2 in particular, the connection 39 between the spacer 29 and the frame 35 is obtained by a screw 43, two washers 44, 45 bearing on a plane portion 46 of the frame 35, a helical spring 47, and a washer 48 associated with the spring.

The screw 43 is screwed into the spacer 29 and the core 13, and it extends along the axis 36. The washer 44 is engaged around the screw 43 and is inserted between the spacer 29 and the inside face of the wall 46.

The washer 45 is engaged on the screw 43 and bears against the outside face of the wall 46.

The spring 47 is engaged on the screw 43 between the washers 45 and 48, against which it bears; the washer 48 is engaged on the screw 43 and bears against the head of the screw.

In the assembly position shown in FIG. 2, the spring 47 is compressed so that the wall 46 is pinched between the washers 44 and 45.

The orifice 49 pierced in the wall 46 and having the screw 43 passing therethrough is of a dimension (diameter) that is considerably greater than the diameter of the screw 43. Thus, relative to the wall 46 of the frame, the screw can move firstly in rotation about its own axis 36, and secondly in translation by sliding on or against the wall 46 of the frame; these two types of movement take place with the washers 44, 45 rubbing against the wall 46, against which the washers are pressed by the spring 47.

The structure and the operation of the connection 40 are identical to those of the connection 39.

Each of the connections 41, 42 presents a structure that is similar, if not identical, to that of the connections 39, 40, thereby enabling the frame 35 to turn about the axis 37 and/or to slide perpendicularly to said axis, with friction against the bracket 38.

For this purpose, the connection 42 between the frame 35 and the bracket 38 is obtained by means of a screw 53, two washers 54, 55 bearing against a plane portion 56 of the bracket 38, a helical spring 57, and a washer 58 associated with the spring.

The screw 53 is screwed into the bracket 38, and extends along the axis 37. The washer 54 is engaged around the screw 53, and is inserted between the frame 35 and the inside face of the wall 56.

The washer 55 is engaged on the screw 53 and bears against the outside face of the wall 56.

The spring 57 is engaged on the screw 53 between the washers 55 and 58 on which it bears; the washer 58 is engaged on the screw 53 and bears against the head of the screw.

In the assembly position shown in FIG. 2, the spring 57 is compressed, such that the wall 56 is pinched between the washers 54 and 55.

The orifice 59 pierced in the wall 56 and through which the screw 53 extends presents a dimension (diameter) that is considerably greater than the diameter of the screw 53. The screw can thus move relative to the wall 56 of the frame firstly in rotation about its axis 37, and secondly in translation by sliding on or against the wall 56 of the bracket 38; these two types of movement take place with the washers 54, 55 rubbing against the wall 56, against which the washers are pressed by the spring 57.

The structure and the operation of the connection 41 are identical to those of the connection 42.

What is claimed is:

1. A transmission system for rotorcraft, said rotorcraft having a structure, said transmission system comprising:
    a shaft; and
    at least an active magnetic damper extending around the shaft, wherein the magnetic damper is secured to the structure of the rotorcraft via at least a non-magnetic damper that is arranged to limit radial oscillations of the shaft and of the magnetic damper,
    the shaft having a ferromagnetic ring secured to the shaft,
    the active magnetic damper comprising a mechanical damper holding four contact connections, each connection enabling pivoting about an axis orthogonal to the axis of the shaft, and also sliding in a plane perpendicular to the axis, with dry friction, said each connection also enabling pivoting about two mutually-perpendicular transverse axes that intersect on the longitudinal axis of the shaft, the active magnetic damper including four identical electromagnets having cores with respective inside faces, said four identical electromagnets being rigidly connected to one another by a structure secured to the structure of the rotorcraft via the mechanical damper, the axes of the connections coinciding substantially with the longitudinal axes of the electromagnets, and the respective inside faces of said electromagnet cores having a concave cylindrical shape of a radius equal to the outside radius of the ferromagnetic ring secured to the shaft, plus the value of an airgap, and of axis parallel to a theoretical axis of the shaft.

2. A transmission system according to claim 1, wherein the non-magnetic damper is a mechanical damper that acts by friction.

3. A transmission system according to claim 1, wherein the non-magnetic damper acts by at least one of compression and traction.

4. A transmission system according to claim 1, wherein the non-magnetic damper includes a return member conferring mechanical stiffness to the non-magnetic damper.

5. A transmission system according to claim 1, wherein the non-magnetic damper includes a plurality of connections, each enabling pivoting about an axis.

6. A transmission system according to claim 1, wherein the non-magnetic damper includes a plurality of connections, each enabling sliding in a plane perpendicular to an axis.

7. A rotorcraft including a transmission system according to claim 1.

* * * * *